Oct. 15, 1940.  E. M. PFAUSER  2,218,318
DETACHABLE CONDUIT COUPLING
Filed May 1, 1939
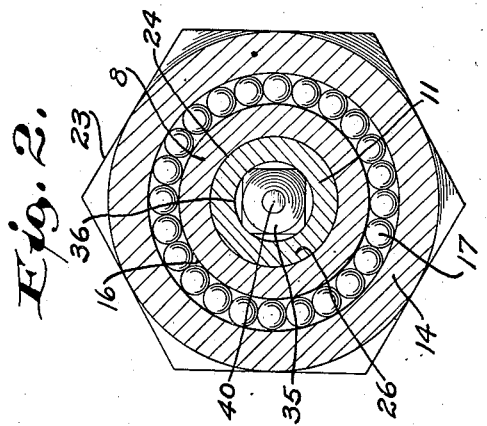
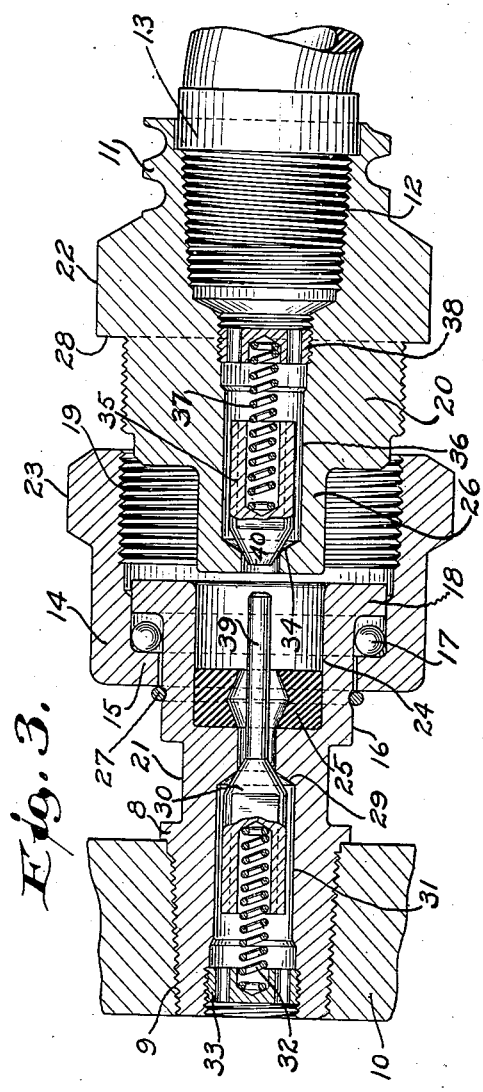
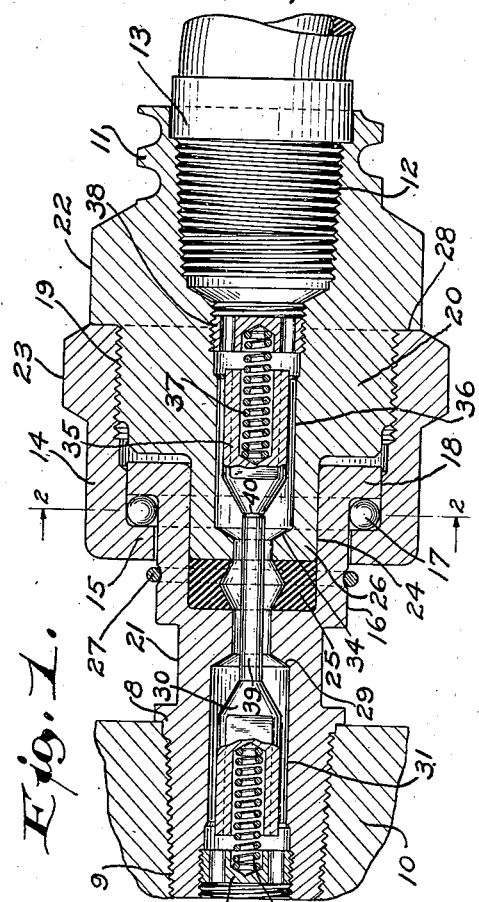
INVENTOR
E. M. Pfauser
BY
Morsell, Lieber & Morsell
ATTORNEYS.

Patented Oct. 15, 1940

2,218,318

UNITED STATES PATENT OFFICE 2,218,318

DETACHABLE CONDUIT COUPLING

Edward M. Pfauser, Elm Grove, Wis., assignor to Blackhawk Mfg. Co., Milwaukee, Wis., a corporation of Wisconsin Application May 1, 1939, Serial No. 271,039

2 Claims. (Cl. 284—19)

The present invention relates generally to improvements in detachable conduit connectors, and relates more specifically to improvements in the construction and operation of couplings for detachably uniting two conduits so as to permit free rotation of one conduit relative to the other, and wherein escape of fluid from the conduits is prevented when the coupling is detached.

Generally stated, an object of the present invention is to provide a new and useful swivel coupling for communicable fluid conducting conduit sections, which will permit ready detachment of the sections without permitting undesirable escape of fluid.

Many different types of detachable conduit couplings have heretofore been proposed, and in some of the prior assemblages it has also been proposed to provide automatic shut-off valves for preventing escape of fluid when the conduit sections were disconnected. Most of these prior coupling assemblages were relatively frail and complicated in construction, and while it is frequently desirable to provide for relative rotation of the conduit sections when coupled, the prior shut-off couplings did not effectively provide for such relative rotation of the elements.

It is therefore a more specific object of my present improvement, to provide a simple and durable detachable conduit coupling wherein escape of fluid from the detached conduit sections is most effectively prevented.

Another specific object of the present invention is to provide an improved shut-off coupling wherein one of the conduit sections is normally swiveled to the other, but wherein the sections may be quickly and conveniently detached from each other.

A further specific object of the invention is to provide an improved coupling assemblage wherein the conduit sections when interconnected are tightly sealed against leakage, and in which escape of fluid from the several sections is automatically and positively prevented when the sections are disconnected.

Still another specific object of my invention is to provide a conduit coupling having an anti-friction swivel bearing which also aids in effecting assembly and detachment of the coupling structure.

An additional specific object of this invention is to provide a compact conduit coupling assemblage which may be readily constructed, and wherein like parts are interchangeable with each other.

These and other objects and advantages will be apparent from the following detailed description.

A clear conception of the features constituting my present improvement and of the mode of constructing and of utilizing several types of detachable conduit couplings built in accordance with the invention, may be had by referring to the drawing accompanying and forming a part of this specification, wherein like reference characters designate the same or similar parts in the various views.

Fig. 1 is a central longitudinal section through one type of my improved detachable swivel coupling with automatic shut-off, showing the conduit sections connected for normal use;

Fig. 2 is a transverse section through the coupling assemblage of Fig. 1, taken along the line 2—2; and Fig. 3 is a section similar to that of Fig. 1, but showing the conduit sections disconnected and the automatic shut-off valves closed.

While I have shown and described the invention as being embodied in only one specific type of conduit coupling having detachable and alineable sections capable of relative rotation by virtue of the provision of a ball bearing between the coacting sections, it is not the intention to thereby unnecessarily restrict the scope or utility of the improvement.

Referring especially to Figs. 1 to 3 inclusive, the improved detachable conduit coupling illustrated therein comprises in general a normally fixed conduit section 8 having one end provided with external screw threads 9 adapted for attachment to a casing 10 or the like; a relatively rotatable conduit section 11 having an end provided with internal screw threads 12 adapted for attachment to a hose fitting 13; and a coupling sleeve 14 having an inwardly directed integral end flange 15 embracing a cylindrical medial portion 16 of the section 8 and coacting through an annular series of bearing balls 17 with an integral end flange 18 of the section 8 to provide an anti-friction swivel bearing, the sleeve 14 also having internal screw threads 19 at its opposite end which are cooperable with external threads formed on the medial portion 20 of the section 11 to detachably interconnect the sections 8, 11.

The normally fixed coupling section 8 may be provided with a polygonal or flattened portion 21 for facilitating attachment thereof to the casing 10; and the coupling section 11 and sleeve 14 may be provided with polygonal portions 22, 23 respectively for facilitating connection and disconnection thereof. The flanged end of the coupling section 8 is provided with an enlarged central bore 24 within which an elastic sealing bushing 25 is permanently confined, and the adjacent end of the other coupling section 11 has a central cylindrical projection 26 which is adapted to snugly fit the bore 24 so as to aline the conduit passages as shown in Fig. 1. The section 8 is moreover provided with an annular recess in portion 16 thereof, in which a snap ring 27 is normally confined so as to limit the displacement of the sleeve flange 15 along the section 8 and away from the flange 18, see Fig. 3; and the other section 11 has an abutment surface 28 with which the end of the sleeve 14 is cooperable to prevent undesirable clamping of the balls 17 between the flanges 15, 18 when the coupling is assembled as in Fig. 1.

The interior of the coupling section 8 has a valve seat 29 therein, with which a poppet valve 30 is cooperable to seal the conduit passage when the coupling is disconnected as in Fig. 3, and the valve 30 is guided for reciprocation within a bore 31 and is constantly urged toward the seat 29 by a coil spring 32 coacting with the valve and reacting against a perforated screw plug 33. The interior of the coupling section 11 also has a valve seat 34 therein, with which another poppet valve 35 is cooperable to seal the conduit passage when the coupling is disconnected as in Fig. 3, and this valve 35 is guided for reciprocation within a bore 36 in the section 11, and is likewise constantly urged toward its seat 34 by a coil spring 37 coacting with the valve 35 and reacting against a perforated screw plug 38. The valve 30 has an integral central projection 39 extending through the bushing 25 and into the bore 24, and this projection is engageable with an end abutment 40 on the valve 35 to lift both valves from their seats as in Fig. 1, when the coupling sections 8, 11 are connected by the sleeve 14.

When constructing the improved coupling, the valve 30 and sealing bushing 25 may be applied within the section 8 as illustrated in Fig. 3, and the coupling sleeve 14 should be applied to the exterior of this section with the bearing balls 17 confined between the flanges 15, 18 by the snap ring 27. The sleeve 14 may then be rotated freely about the sleeve portion 16, but the balls 17 cannot escape. The valve 35 may likewise be applied to the interior of the section 11, and the sections 8, 11 may then be attached to the casing 10 and fitting 13 respectively. The valves 30, 35 will then be pressed tightly against their respective seats 29, 34 by the springs 32, 37 thereby sealing the passages through the sections 8, 11 against possible escape of fluid to the atmosphere.

The coupling may be connected to open the passages through the sections 8, 11, by merely inserting the end projection 26 of the section 11 within the bore 24 of the section 8, and by subsequently causing the threads 19 of the connecting sleeve 14 to coact with the threaded portion 20 of the section 11. As the sections 8, 11 are drawn in alinement toward each other by rotation of the sleeve 14 relative to the section 11, the central projection 39 of the valve 30 will engage the abutment 40 of the valve 35, and both of these valves will be opened against the spring pressures acting thereon, as shown in Fig. 1, and open communication will be established between the bores 31, 36. The end of the projection 26 will also eventually engage and slightly compress the seal 25, and when the end of the coupling sleeve 14 finally engages the abutment 28, the flanges 15, 18 should be spaced apart sufficiently so that the balls 17 will not be undesirably clamped against free movement. With the coupling thus finally assembled and connected, the section 11 and sleeve 14 may be rotated as a unit relative to the fixed section 8; and in order to disconnect the sections 8, 11 it is only necessary to unscrew the sleeve 14 whereupon the springs 32, 37 will again close their respective valves 30, 35 and seal the passages. It will therefore be apparent that the assemblage of Figs. 1 to 3 inclusive provides a simple detachable coupling wherein the sections 8, 11 are relatively rotatable and tightly sealed during normal use, and in which the passages are automatically sealed against escape of fluid when the sections are uncoupled.

From the foregoing detailed description it will be apparent that my present invention provides an improved coupling assemblage of relatively simple and compact construction, which will permit convenient detachment of the coupling sections while also providing for free rotation of one of the sections relative to the other. Either one or both sections may be fixed or rotatable, and the disconnecting sleeve may be carried by either the fixed or the rotatable section. In the improvement illustrated herein, one of the sections is accurately alined with respect to the other by means of the projection thereon coacting with the bore of the other section, and in any event the coupling is effectively sealed against possible escape of fluid when the sections are interconnected. The shut-off valves provided in the several sections will moreover automatically and effectively prevent escape of fluid from the individual sections, when the coupling is disconnected. While it is preferable to utilize ball bearings for the purpose of providing an anti-friction rotation permitting bearing between the two sections, these may of course be omitted or replaced by other anti-friction bearing elements.

The bearing balls are confined against possible escape from the assemblage, and are also relieved of clamping pressure tending to destroy the utility of the anti-friction bearing. These improved couplings have proven highly satisfactory in actual use, and they may be manufactured and sold at relatively moderate cost and may also be conveniently assembled and dismantled because all parts are readily accessible, with the aid of ordinary tools. The improved couplings shown and described herein are particularly adapted for use where high fluid pressures prevail in conduits.

It should be understood that it is not desired to limit this invention to the exact details of construction or to the precise mode of use, herein shown and described, for various modifications within the scope of the claims may occur to persons skilled in the art.

I claim:

1. A conduit coupling comprising, a conduit section having a central bore at one end and a relatively small opening extending from the bore bottom to the opposite end of the section, said opening having a counter-bore providing a valve seat remote from the bottom of said bore, an annular packing snugly and permanently confined in the bottom of said bore, a valve coacting with said seat, a second conduit section having a reduced end portion snugly fitting said bore and coacting with said packing and being provided with a central through opening having a counter-bore providing another valve seat remote from said packing, a second valve coacting with said other seat in alinement with said first mentioned valve, one of said valves having a rigid projection extending freely through said packing and being engageable with the other valve to lift both valves off of their seats, a sleeve having screw thread coaction with said second section for detachably interconnecting said sections and for compressing said packing, and an annular series of anti-friction bearing elements interposed between said sleeve and said first mentioned conduit sections for permitting free relative rotation of said sections when interconnected.

2. A conduit coupling comprising, a primary conduit section having a central bore at one end and a relatively small opening extending from the bore bottom to the opposite end of the section, said opening having a counter-bore providing a valve seat remote from the bottom of said bore, an annular compressible packing snugly and permanently confined in the bottom of said bore, a valve coacting with said seat, a secondary conduit section having a reduced end portion snugly fitting said bore and coacting with said packing and being provided with a central through opening having a counter-bore providing another valve seat remote from said packing, a second valve coacting with said other seat in alinement with said first mentioned valve, one of said valves having a rigid projection extending freely through said packing and being engageable with the other valve to lift both valves off of their seats, a sleeve having screw thread coaction with said secondary section for detachably interconnecting said sections and for compressing said packing, said sleeve having an inwardly extending flange and said primary section having an outwardly extending flange coacting with said sleeve flange to provide an annular bearing interposed between said sleeve and said primary section for permitting free relative rotation of said sections when interconnected, and detachable means carried by said primary section and coacting with said sleeve flange to prevent undesirable axial separation of said bearing flanges.

EDWARD M. PFAUSER.